M. A. DAVIS.
AUTOMOBILE WINDLASS.
APPLICATION FILED MAR. 9, 1921.
1,393,349.
Patented Oct. 11, 1921.
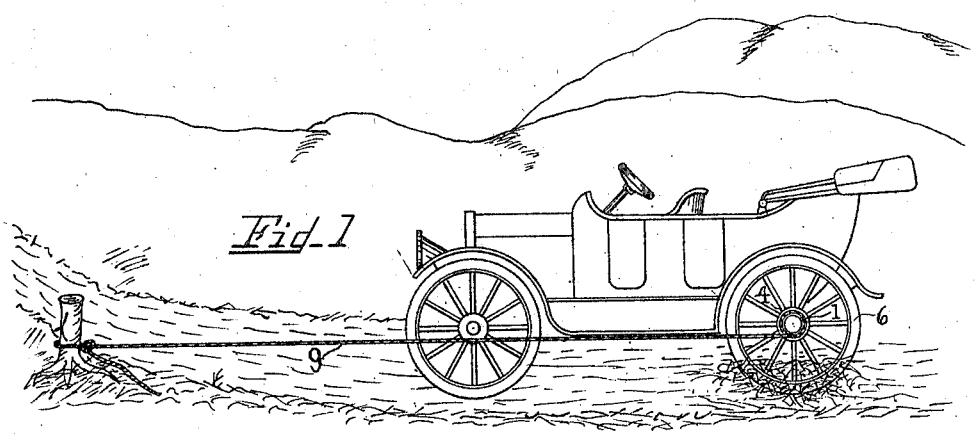
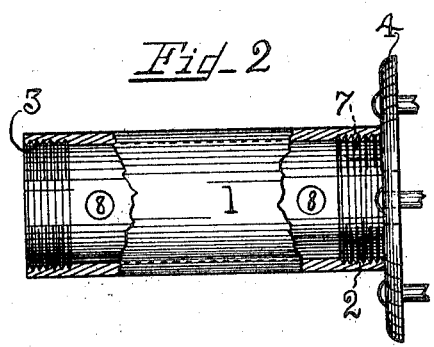
Inventor.
Marion A. Davis
By J. P. Dederick.
Attorney.

UNITED STATES PATENT OFFICE.

MARION A. DAVIS, OF SHERMAN, TEXAS.

AUTOMOBILE-WINDLASS.

1,393,349.

Specification of Letters Patent.  Patented Oct. 11, 1921.

Application filed March 9, 1921. Serial No. 450,907.

*To all whom it may concern:*

Be it known that I, MARION A. DAVIS, a citizen of the United States, residing at Sherman, in the county of Grayson and State of Texas, have invented certain new and useful Improvements in Automobile-Windlasses, of which the following is a specification.

This invention relates to certain new and useful improvements in automobile windlasses, and has for its object improvements in the devices heretofore patented to me, No. 1,321,366, dated Nov. 11th, 1919, and No. 1,337,757, dated Apr. 20th, 1920. In the said patented windlasses the characteristic feature is the employment of hooked rods adapted for attachment to the spokes of the rear wheel of an automobile, and this invention relates particularly to improvements in the windlass attaching mechanism.

In addition to the windlass attaching means generally, the invention likewise comprehends certain details of construction, all of which will be fully set forth hereinafter.

In the accompanying drawings Figure 1 is a side elevation of a stalled automobile showing the extricating means attached. Fig. 2 is an enlarged side elevation of the preferred embodiment of the invention with parts broken away.

Referring to the drawings by numerals, and more particularly to Fig. 2, wherein is illustrated the preferred embodiment of the invention, 1 designates the drum of the windlass and comprises a piece of metal tubing both ends of which are interiorly threaded. One end is threaded right hand as indicated by 2, and the other end provided with a left hand thread 3.

With this device each of the outer hub flanges 4 and 5 of the rear wheels 6 of the automobile has an outwardly projecting annular flange 7, which is of a size in cross section corresponding to the size of the threaded portions of the tube 1, and is exteriorly threaded right and left hand respectively, to either of which the drum 1 is adapted to be attached, and by which, in either case it is held in operative position. A bar may be inserted in either of the apertures 8 if found necessary, to screw the windlass solidly to the flange, and one of the apertures is also used for engaging a hook, usually attached to the end of the tiller rope 9, when the device is required for use. As thus shown it should comprise part of the factory equipment of all new cars.

Having now set forth the object and nature of my invention and a form of embodiment of the same, and having described the construction, function, and mode of operation thereof, what I claim as new and desire to secure by Letters Patent, is—

The combination in an automobile windlass of a horizontally disposed tubular section right and left hand threaded interiorly at its respective ends adapted for engagement with an annular flange exteriorly threaded and outwardly extending from the hub flange of a wheel at either side of a car.

In testimony whereof I affix my signature.

MARION A. DAVIS.